United States Patent
Lubischer et al.

(10) Patent No.: US 10,343,706 B2
(45) Date of Patent: Jul. 9, 2019

(54) RETRACTABLE STEERING COLUMN SYSTEM, VEHICLE HAVING THE SAME, AND METHOD

(71) Applicant: Steering Solutions IP Holding Corporation, Saginaw, MI (US)

(72) Inventors: Frank P. Lubischer, Commerce Township, MI (US); Richard K. Riefe, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/989,153

(22) Filed: Jan. 6, 2016

(65) Prior Publication Data
US 2016/0362126 A1 Dec. 15, 2016

Related U.S. Application Data

(60) Provisional application No. 62/174,114, filed on Jun. 11, 2015.

(51) Int. Cl.
*B62D 1/183* (2006.01)
*B62D 1/19* (2006.01)
*B62D 1/28* (2006.01)

(52) U.S. Cl.
CPC ............... *B62D 1/183* (2013.01); *B62D 1/19* (2013.01); *B62D 1/28* (2013.01)

(58) Field of Classification Search
CPC . B62D 1/12; B62D 1/16; B62D 1/181; B62D 1/183; B62D 1/185; B62D 1/19;
(Continued)

(56) References Cited

U.S. PATENT DOCUMENTS

| 1,795,567 A | 3/1931 | Maurice |
| 3,369,425 A | 2/1968 | Runkle et al. |

(Continued)

FOREIGN PATENT DOCUMENTS

| CN | 1550395 A | 12/2004 |
| CN | 1722030 A | 1/2006 |

(Continued)

OTHER PUBLICATIONS

China Patent Application No. 201510204221.5 Second Office Action dated Mar. 10, 2017, 8 pages.
(Continued)

*Primary Examiner* — Barry Gooden, Jr.
(74) *Attorney, Agent, or Firm* — Cantor Colburn LLP

(57) ABSTRACT

A steering column system includes a steering column shaft, a steering input device coupled to the steering column shaft, an energy absorbing mechanism operatively engaged with at least one of the steering column shaft and the steering input device, a column adjustment assembly configured to translate the steering column shaft between a retracted position and a driving position, and at least one signal indicating if the steering column shaft is in the retracted position or the driving position. When the steering column shaft is in the retracted position, directional control of a vehicle is automated, and when the steering column shaft is returned to the driving position as indicated by the at least one signal, the energy absorbing mechanism is operational.

18 Claims, 3 Drawing Sheets

(58) Field of Classification Search
CPC .......... B62D 1/192; B62D 1/28; B62D 1/286; B60R 2021/01313; B60Q 7/1469
See application file for complete search history.

(56) References Cited

U.S. PATENT DOCUMENTS

| | | |
|---|---|---|
| 3,386,309 A | 6/1968 | Reed et al. |
| 3,396,600 A | 8/1968 | Zeigler et al. |
| 3,782,492 A | 1/1974 | Hollins |
| 4,138,167 A | 2/1979 | Ernst et al. |
| 4,315,117 A | 2/1982 | Kokubo et al. |
| 4,337,967 A | 7/1982 | Yoshida et al. |
| 4,476,954 A | 10/1984 | Johnson et al. |
| 4,503,300 A | 3/1985 | Lane, Jr. |
| 4,503,504 A | 3/1985 | Suzumura et al. |
| 4,509,386 A | 4/1985 | Kimberlin |
| 4,535,645 A | 8/1985 | De Bisschop et al. |
| 4,559,816 A | 12/1985 | Ebert et al. |
| 4,561,323 A | 12/1985 | Stromberg |
| 4,570,776 A | 2/1986 | Iwashita et al. |
| 4,598,604 A | 7/1986 | Sorsche et al. |
| 4,602,520 A | 7/1986 | Nishikawa et al. |
| 4,633,732 A | 1/1987 | Nishikawa et al. |
| 4,661,752 A | 4/1987 | Nishikawa et al. |
| 4,669,325 A | 6/1987 | Nishikawa |
| 4,691,587 A | 9/1987 | Farrand et al. |
| 4,785,684 A | 11/1988 | Nichikawa et al. |
| 4,811,580 A | 3/1989 | Jang |
| 4,836,566 A | 6/1989 | Birsching |
| 4,881,020 A | 11/1989 | Hida et al. |
| 4,893,518 A | 1/1990 | Matsumoto et al. |
| 4,901,544 A | 2/1990 | Jang |
| 4,901,593 A | 2/1990 | Ishikawa |
| 4,921,066 A | 5/1990 | Conley |
| 4,941,679 A | 7/1990 | Baumann et al. |
| 4,943,028 A | 7/1990 | Hoffmann et al. |
| 4,962,570 A | 10/1990 | Hosaka et al. |
| 4,967,618 A | 11/1990 | Matsumoto et al. |
| 4,976,239 A | 12/1990 | Hosaka |
| 5,048,364 A | 9/1991 | Minamoto et al. |
| 5,226,853 A | 7/1993 | Courgeon |
| 5,240,284 A | 8/1993 | Takada et al. |
| 5,295,712 A | 3/1994 | Omura |
| 5,319,803 A | 6/1994 | Allen |
| 5,428,873 A | 7/1995 | Hitchcock et al. |
| 5,488,555 A | 1/1996 | Asgari et al. |
| 5,590,565 A | 1/1997 | Palfenier et al. |
| 5,606,892 A | 3/1997 | Hedderly |
| 5,613,404 A | 3/1997 | Lykken et al. |
| 5,618,058 A | 4/1997 | Byon |
| 5,668,721 A | 9/1997 | Chandy |
| 5,678,454 A | 10/1997 | Cartwright et al. |
| 5,690,362 A | 11/1997 | Peitsmeier et al. |
| 5,737,971 A | 4/1998 | Riefe et al. |
| 5,765,116 A | 6/1998 | Wilson-Jones et al. |
| 5,813,699 A | 9/1998 | Donner et al. |
| 5,890,397 A | 4/1999 | Stoner et al. |
| 5,893,580 A | 4/1999 | Hoagland et al. |
| 5,911,789 A | 6/1999 | Keipert et al. |
| 5,931,250 A | 8/1999 | Kagawa et al. |
| 5,941,130 A | 8/1999 | Dlgren et al. |
| 6,041,677 A | 3/2000 | Reh et al. |
| 6,070,686 A * | 6/2000 | Pollmann ............ B60R 25/0221 180/287 |
| 6,079,513 A | 6/2000 | Nishizaki et al. |
| 6,142,523 A | 11/2000 | Bathis |
| 6,170,862 B1 | 1/2001 | Hoagland et al. |
| 6,220,630 B1 | 4/2001 | Sundholm et al. |
| 6,227,571 B1 | 5/2001 | Sheng et al. |
| 6,234,040 B1 | 5/2001 | Weber et al. |
| 6,264,239 B1 | 7/2001 | Link |
| 6,301,534 B1 | 10/2001 | McDermott, Jr. |
| 6,343,993 B1 | 2/2002 | Duval et al. |
| 6,354,622 B1 | 3/2002 | Ulbrich et al. |
| 6,354,626 B1 | 3/2002 | Cartwright |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,460,427 B1 | 10/2002 | Hedderly |
| 6,571,587 B2 | 6/2003 | Dimig et al. |
| 6,578,449 B1 | 6/2003 | Anspaugh et al. |
| 6,612,198 B2 | 9/2003 | Rouleau et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,025,380 B2 | 4/2006 | Arihara |
| 7,048,305 B2 | 5/2006 | Muller |
| 7,062,365 B1 | 6/2006 | Fei |
| 7,140,213 B2 | 11/2006 | Feucht et al. |
| 7,159,904 B2 | 1/2007 | Schafer et al. |
| 7,213,842 B2 | 5/2007 | Uehle et al. |
| 7,258,365 B2 | 8/2007 | Kahlenberg et al. |
| 7,261,014 B2 | 8/2007 | Arihara |
| 7,290,800 B2 | 11/2007 | Schwarzbich et al. |
| 7,295,904 B2 | 11/2007 | Kanevsky et al. |
| 7,308,964 B2 | 12/2007 | Hara et al. |
| 7,410,190 B2 | 8/2008 | Sawada et al. |
| 7,428,944 B2 | 9/2008 | Gerum |
| 7,461,863 B2 | 12/2008 | Muller |
| 7,495,584 B1 | 2/2009 | Sorensen |
| 7,533,594 B2 | 5/2009 | Menjak et al. |
| 7,628,244 B2 | 12/2009 | Chino et al. |
| 7,719,431 B2 | 5/2010 | Bolourchi |
| 7,735,405 B2 | 6/2010 | Parks |
| 7,758,073 B1 | 7/2010 | Chou |
| 7,775,129 B2 | 8/2010 | Oike et al. |
| 7,784,830 B2 | 8/2010 | Ulintz |
| 7,793,980 B2 | 9/2010 | Fong |
| 7,862,079 B2 | 1/2011 | Fukawatase et al. |
| 7,975,569 B2 | 1/2011 | Klos |
| 7,894,951 B2 | 2/2011 | Norris et al. |
| 7,909,361 B2 | 3/2011 | Oblizajek et al. |
| 7,913,803 B2 | 3/2011 | Hidaka |
| 8,002,075 B2 | 8/2011 | Markfort |
| 3,021,235 A1 | 9/2011 | Tinnin et al. |
| 8,011,265 B2 | 9/2011 | Menjak et al. |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,161,839 B2 | 4/2012 | Warashina |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,466,382 B2 | 6/2013 | Donicke |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,733,201 B2 | 5/2014 | Okano et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,955,407 B2 | 2/2015 | Sakuma |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,039,041 B2 | 5/2015 | Buzzard et al. |
| 9,045,078 B2 | 6/2015 | Tovar et al. |
| 9,073,574 B2 | 7/2015 | Cuddihy et al. |

(56) References Cited

U.S. PATENT DOCUMENTS

| | | |
|---|---|---|
| 9,080,895 B2 | 7/2015 | Martin et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,296,410 B2 | 3/2016 | Isogai et al. |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 * | 5/2016 | Lathrop .................. B62D 1/04 |
| 9,352,752 B2 | 5/2016 | Cullinane et al. |
| 9,360,108 B2 | 6/2016 | Pfenninger et al. |
| 9,360,865 B2 | 6/2016 | Yopp |
| 9,421,994 B2 | 8/2016 | Agbor et al. |
| 9,487,228 B2 | 11/2016 | Febre et al. |
| 9,616,914 B2 | 4/2017 | Stinebring et al. |
| 9,643,641 B1 | 5/2017 | Stinebring et al. |
| 9,663,136 B2 | 5/2017 | Stinebring et al. |
| 9,744,983 B2 | 8/2017 | Stinebring et al. |
| 9,845,106 B2 | 12/2017 | Bodtker |
| 9,849,904 B2 | 12/2017 | Rouleau |
| 9,852,752 B1 | 12/2017 | Chou et al. |
| 9,862,403 B1 | 1/2018 | Rouleau et al. |
| 9,919,724 B2 | 3/2018 | Lubischer et al. |
| 10,065,655 B2 | 9/2018 | Bendewald et al. |
| 10,131,375 B2 | 11/2018 | Schmidt et al. |
| 2002/0171235 A1 | 11/2002 | Riefe et al. |
| 2003/0046012 A1 | 3/2003 | Yamaguchi |
| 2003/0094330 A1 | 5/2003 | Boloorchi et al. |
| 2003/0146037 A1 | 8/2003 | Menjak et al. |
| 2003/0183440 A1 | 10/2003 | Thomas et al. |
| 2003/0188598 A1 | 10/2003 | Cartwright |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0046379 A1 | 3/2004 | Riefe |
| 2004/0099083 A1 | 5/2004 | Choi et al. |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0242562 A1 | 11/2005 | Ridgway et al. |
| 2005/0263996 A1 | 12/2005 | Manwaring et al. |
| 2005/0275205 A1 | 12/2005 | Ahnafield |
| 2006/0005658 A1 | 1/2006 | Armstrong et al. |
| 2006/0186658 A1 | 8/2006 | Yasuhara et al. |
| 2006/0202463 A1 | 9/2006 | Schwarzbich et al. |
| 2006/0219499 A1 | 10/2006 | Organek |
| 2006/0224287 A1 | 10/2006 | Izawa et al. |
| 2006/0237959 A1 | 10/2006 | Dimig et al. |
| 2006/0244251 A1 | 11/2006 | Muller |
| 2006/0283281 A1 | 12/2006 | Li et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0096446 A1 | 5/2007 | Breed |
| 2007/0126222 A1 | 6/2007 | Koya et al. |
| 2007/0158116 A1 | 7/2007 | Peppler |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0028884 A1 | 2/2008 | Monash |
| 2008/0047382 A1 | 2/2008 | Tomaru et al. |
| 2008/0079253 A1 | 4/2008 | Sekii et al. |
| 2008/0216597 A1 | 9/2008 | Iwakawa et al. |
| 2008/0238068 A1 | 10/2008 | Kumar et al. |
| 2008/0264196 A1 | 10/2008 | Schindler et al. |
| 2009/0024278 A1 | 1/2009 | Kondo et al. |
| 2009/0056493 A1 | 3/2009 | Dubay et al. |
| 2009/0107284 A1 | 4/2009 | Lucas et al. |
| 2009/0229400 A1 | 9/2009 | Ozsoylu et al. |
| 2009/0256342 A1 | 10/2009 | Cymbal et al. |
| 2009/0266195 A1 | 10/2009 | Tanke et al. |
| 2009/0276111 A1 | 11/2009 | Wang et al. |
| 2009/0280914 A1 | 11/2009 | Kakutani et al. |
| 2009/0292466 A1 | 11/2009 | McCarthy et al. |
| 2010/0152952 A1 | 6/2010 | Lee et al. |
| 2010/0218637 A1 | 9/2010 | Barroso |
| 2010/0222976 A1 | 9/2010 | Haug |
| 2010/0228417 A1 | 9/2010 | Lee et al. |
| 2010/0228438 A1 | 9/2010 | Lutz |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2011/0314954 A1 | 12/2011 | Matsuno et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2012/0247259 A1 | 10/2012 | Mizuno et al. |
| 2012/0287050 A1 | 11/2012 | Wu |
| 2013/0002416 A1 * | 1/2013 | Gazit .................. B62D 1/28 |
| | | 340/438 |
| 2013/0325202 A1 | 1/2013 | Howard et al. |
| 2013/0087006 A1 | 4/2013 | Ohtsubo et al. |
| 2013/0104689 A1 | 5/2013 | Marutani et al. |
| 2013/0133463 A1 | 5/2013 | Moriyama |
| 2013/0158771 A1 | 6/2013 | Kaufmann |
| 2013/0174686 A1 | 7/2013 | Hirche et al. |
| 2013/0199866 A1 | 8/2013 | Yamamoto et al. |
| 2013/0205933 A1 | 8/2013 | Moriyama |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2014/0028008 A1 | 1/2014 | Stadler et al. |
| 2014/0046542 A1 | 2/2014 | Kauffman et al. |
| 2014/0046547 A1 | 2/2014 | Kaufmann et al. |
| 2014/0111324 A1 | 4/2014 | Lisseman et al. |
| 2014/0116187 A1 | 5/2014 | Tinnin |
| 2014/0137694 A1 | 5/2014 | Sugiura |
| 2014/0277896 A1 * | 9/2014 | Lathrop .................. B62D 1/04 |
| | | 701/23 |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 1/2015 | Hahne |
| 2015/0120142 A1 | 1/2015 | Park et al. |
| 2015/0060185 A1 | 3/2015 | Feguri |
| 2015/0246673 A1 | 4/2015 | Tseng et al. |
| 2015/0137492 A1 * | 5/2015 | Rao .................. B60R 21/017 |
| | | 280/729 |
| 2015/0203145 A1 | 7/2015 | Sugiura et al. |
| 2015/0203149 A1 | 7/2015 | Katayama et al. |
| 2015/0210273 A1 | 7/2015 | Kaufmann et al. |
| 2015/0251666 A1 | 7/2015 | Attard et al. |
| 2015/0283998 A1 | 9/2015 | Lind et al. |

(56) References Cited

U.S. PATENT DOCUMENTS

| | | |
|---|---|---|
| 2015/0324111 A1 | 9/2015 | Jubner et al. |
| 2015/0375769 A1 | 12/2015 | Abboud et al. |
| 2016/0009332 A1 | 1/2016 | Sirbu |
| 2016/0016604 A1 | 1/2016 | Johta et al. |
| 2016/0075371 A1 | 3/2016 | Varunkikar et al. |
| 2016/0082867 A1 | 3/2016 | Sugioka et al. |
| 2016/0200246 A1 | 3/2016 | Lisseman et al. |
| 2016/0114828 A1 | 4/2016 | Tanaka et al. |
| 2016/0185387 A1 | 6/2016 | Kuoch |
| 2016/0200343 A1 | 6/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0244070 A1 | 8/2016 | Bendewald et al. |
| 2016/0244086 A1 | 8/2016 | Moriyama |
| 2016/0252133 A1 | 9/2016 | Caverly |
| 2016/0318540 A1* | 11/2016 | King ............... B60Q 1/1469 |
| 2016/0318542 A1 | 11/2016 | Pattok et al. |
| 2016/0347347 A1 | 12/2016 | Lubischer |
| 2016/0347348 A1* | 12/2016 | Lubischer ............ B62D 1/181 |
| 2016/0362084 A1 | 12/2016 | Martin et al. |
| 2016/0362117 A1 | 12/2016 | Kaufmann et al. |
| 2016/0362126 A1* | 12/2016 | Lubischer ............ B62D 1/183 |
| 2016/0368522 A1* | 12/2016 | Lubischer ............ B62D 1/181 |
| 2016/0375770 A1* | 12/2016 | Ryne ................... B60K 35/00 701/23 |
| 2016/0375860 A1* | 12/2016 | Lubischer ............ B60R 22/48 74/493 |
| 2016/0375923 A1* | 12/2016 | Schulz ................. B62D 1/02 74/493 |
| 2016/0375924 A1* | 12/2016 | Bodtker ............... B62D 1/046 74/552 |
| 2016/0375925 A1* | 12/2016 | Lubischer ........... G05D 1/0061 701/41 |
| 2016/0375926 A1* | 12/2016 | Lubischer ............ B62D 1/183 74/493 |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0097071 A1 | 4/2017 | Galehr |
| 2017/0106894 A1 | 4/2017 | Bodtker |
| 2017/0106895 A1 | 4/2017 | Jager et al. |
| 2017/0113589 A1 | 4/2017 | Riefe |
| 2017/0113712 A1 | 4/2017 | Watz |
| 2017/0158222 A1 | 6/2017 | Schulz et al. |
| 2017/0151975 A1 | 7/2017 | Schmidt et al. |
| 2017/0294120 A1 | 10/2017 | Ootsuji |
| 2017/0297606 A1 | 10/2017 | Kim et al. |
| 2017/0361863 A1 | 12/2017 | Rouleau |
| 2017/0369091 A1 | 12/2017 | Nash |
| 2018/0029628 A1 | 2/2018 | Sugishita |
| 2018/0050720 A1 | 2/2018 | King et al. |
| 2018/0072339 A1 | 3/2018 | Bodtker |
| 2018/0079441 A1 | 3/2018 | McKinzie et al. |
| 2018/0086378 A1 | 3/2018 | Bell et al. |
| 2018/0111639 A1 | 4/2018 | Bodtker et al. |
| 2018/0148084 A1 | 5/2018 | Nash et al. |
| 2018/0154932 A1 | 6/2018 | Rakouth et al. |
| 2018/0229753 A1 | 8/2018 | Magnus et al. |
| 2018/0251147 A1 | 9/2018 | Heitz et al. |
| 2018/0273081 A1 | 9/2018 | Lubischer et al. |
| 2019/0002010 A1* | 1/2019 | Cao .................... B62D 1/187 |

FOREIGN PATENT DOCUMENTS

| | | | |
|---|---|---|---|
| CN | 1736786 A | 2/2006 | |
| CN | 101037117 A | 9/2007 | |
| CN | 101041355 A | 9/2007 | |
| CN | 101049814 A | 10/2007 | |
| CN | 101291840 A | 10/2008 | |
| CN | 101402320 A | 4/2009 | |
| CN | 101596903 A | 12/2009 | |
| CN | 201534560 U | 7/2010 | |
| CN | 101954862 A | 1/2011 | |
| CN | 102161346 A | 8/2011 | |
| CN | 102452391 A | 5/2012 | |
| CN | 102523738 A | 6/2012 | |
| CN | 102574545 B | 7/2012 | |
| CN | 202337282 U | 7/2012 | |
| CN | 102806937 A | 12/2012 | |
| CN | 103085854 A | 5/2013 | |
| CN | 103419840 A2 | 12/2013 | |
| CN | 103448785 A | 12/2013 | |
| CN | 103587571 A | 2/2014 | |
| CN | 203793405 U | 8/2014 | |
| CN | 204222957 U | 3/2015 | |
| DE | 4310431 A1 | 10/1994 | |
| DE | 19523214 A1 * | 1/1997 | ......... B60R 25/0221 |
| DE | 19923012 A1 | 11/2000 | |
| DE | 19954505 A1 | 5/2001 | |
| DE | 10212782 A1 | 10/2003 | |
| DE | 102005032528 A1 | 1/2007 | |
| DE | 102005056438 A1 | 6/2007 | |
| DE | 102006025254 A1 | 12/2007 | |
| DE | 1020081057313 A1 | 10/2009 | |
| DE | 102010025197 A1 | 12/2011 | |
| DE | 102015216326 B4 | 9/2016 | |
| EP | 1559630 A2 | 8/2005 | |
| EP | 1783719 A2 | 5/2007 | |
| EP | 1932745 A2 | 6/2008 | |
| EP | 2384946 A2 | 11/2011 | |
| EP | 2426030 A1 | 3/2012 | |
| EP | 2489577 A2 | 8/2012 | |
| EP | 2604487 A1 | 6/2013 | |
| EP | 1606149 B1 | 5/2014 | |
| FR | 2862595 A1 | 5/2005 | |
| FR | 3016327 A1 | 7/2015 | |
| JP | S58191668 A | 11/1983 | |
| JP | S60157963 A | 8/1985 | |
| JP | H05162652 A | 6/1993 | |
| JP | 2007253809 A | 10/2007 | |
| JP | 2012201334 A | 10/2012 | |
| KR | 20100063433 A | 6/2010 | |
| KR | 101062339 B1 | 9/2011 | |
| WO | 2006099483 A1 | 9/2006 | |
| WO | 2010082394 A1 | 7/2010 | |
| WO | 2010116518 A1 | 10/2010 | |
| WO | 2014208573 A1 | 12/2014 | |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.

(56) References Cited

OTHER PUBLICATIONS

European Search Report for related European Application No. 15152834.6, dated Oct. 8, 2015; 7 pages.
Gillespie, Thomas D.; "Fundamentals of Vehicle Dynamics"; Society of Automotive Engineers, Inc.; published 1992; 294 pages.
Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.
Partial European Search Report for related European Patent Application No. 14156903.8, dated Sep. 23, 2014, 6 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
Office Action regarding related CN App. No. 10204221.5; dated Aug. 29, 2016.
Chinese Office Action & Search Report for Chinese Application No. 2016103666609.X dated Dec. 20, 2017, inlcuding English Translation, 16 pages.
Chinese Office Action & Search Report for Chinese Application No. 201610427896.0 dated Oct. 27, 2017, 16 pages, English Translation Included.
Chinese Office Action & Search Report for Chinese Application No. 201610620335.2 dated Jan. 22, 2018, 15 pages, English Translation Included.
Chinese Office Action & Search Report for Chinese Application No. 201610642300.9 dated Feb. 7, 2018, 22 pages, English Translation Only.
Chinese Office Action & Search Report for Chinese Application No. 201610651953.3 dated Jan. 25, 2018, 12 pages, English Translation Included.
Chinese Office Action & Search Report for Chinese Application No. 201610830808.1 dated Apr. 3, 2018, 30 pages, English Translation Included.
Chinese Office Action & Search Report for Chinese Application No. 201610830809.6 dated Mar. 12, 2018, 11 pages, English Translation Included.
Chinese Office Action & Search Report for Chinese Application No. 201610830810.9 dated Jan. 31, 2018, 18 pages, English Translation Included.
Chinese Office Action & Search Report for Chinese Application No. 201611113746.9 dated May 4, 2018, 11 pages, English Translation Included.
Chinese Office Action for Chinese Application No. 201610427896.0 dated May 28, 2018 16 pages, English Translation Included.

* cited by examiner

RETRACTABLE STEERING COLUMN SYSTEM, VEHICLE HAVING THE SAME, AND METHOD

CROSS-REFERENCE TO RELATED APPLICATIONS

This patent application claims priority to U.S. Provisional Patent Application Ser. No. 62/174,114, filed Jun. 11, 2015, which is incorporated herein by reference in its entirety.

FIELD OF THE INVENTION

The following description relates to steering column assemblies and, more specifically, to a retractable steering column assembly.

BACKGROUND

Vehicle steering wheels are typically used to steer a vehicle. When a vehicle is equipped with an autonomous driving assist system ("ADAS"), the steering wheel does not need to rotate as the self-driving system turns the road wheels. This non-rotation allows the steering column and wheel to have another use or purpose.

Accordingly, it is desirable to provide a steering column assembly that enables the driver to manipulate the position or purpose of the steering wheel.

SUMMARY OF THE INVENTION

In one exemplary embodiment of the present disclosure, a steering column system includes a steering column shaft, a steering input device coupled to the steering column shaft, an energy absorbing mechanism operatively engaged with at least one of the steering column shaft and the steering input device, a column adjustment assembly configured to translate the steering column shaft between a retracted position and a driving position, and at least one signal indicating if the steering column shaft is in the retracted position or the driving position. When the steering column shaft is in the retracted position, directional control of a vehicle is automated, and when the steering column shaft is returned to the driving position as indicated by the at least one signal, the energy absorbing mechanism is operational.

In another exemplary embodiment of the present disclosure, a vehicle includes a steering column shaft, a steering input device coupled to the steering column shaft, an energy absorbing mechanism operatively engaged with at least one of the steering column shaft and the steering input device, a column adjustment assembly configured to translate the steering column shaft between a retracted position and a driving position, and at least one signal indicating if the steering column shaft is in the retracted position or the driving position. When the steering column shaft is in the retracted position, directional control of the vehicle is automated, and when the steering column shaft is returned to the driving position as indicated by the at least one signal, the energy absorbing mechanism is operational.

In yet another exemplary embodiment of the present invention, a method of operating a steering column assembly of a vehicle includes translating a steering column shaft from a retracted position towards an extended, driving position; sending at least one signal to a controller indicating whether the steering column shaft is in the extended, driving position; and, engaging an energy absorbing mechanism to be operational when the steering column shaft is in the extended, driving position as indicated by the at least one signal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

A detailed description of one or more embodiments of the disclosed system and method are presented herein by way of exemplification and not limitation with reference to the Figures.

Figure 1:
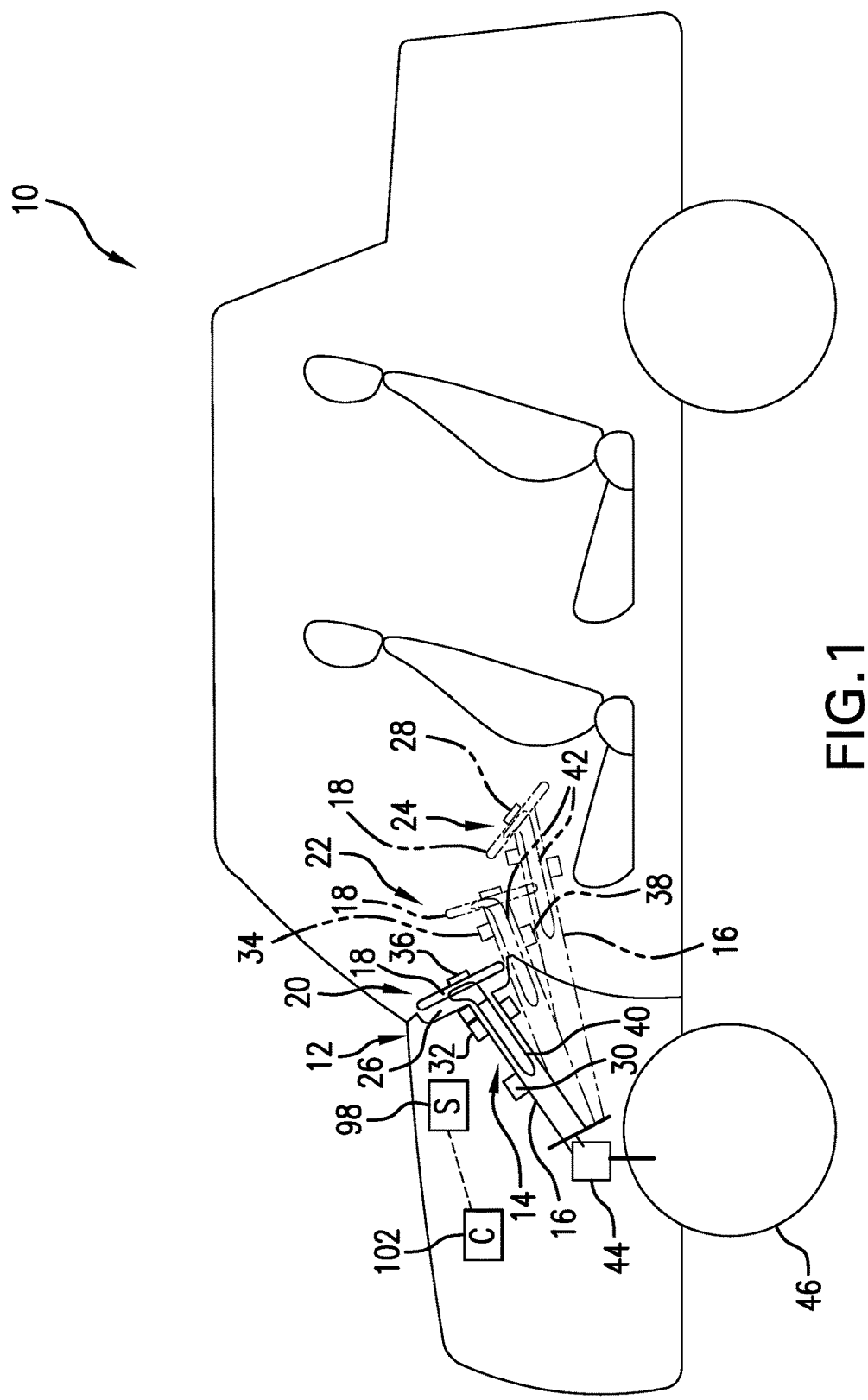
FIG. 1 is a schematic view of a vehicle and steering column assembly according to one embodiment of the disclosure; and, FIGS. 2A and 2B show a flowchart demonstrating an operation of the vehicle and steering column assembly according to one embodiment of the disclosure.

Referring now to the Figures, where embodiments will be described, without limiting same, FIG. 1 schematically illustrates an embodiment of a vehicle 10, such as an autonomous driving assisted steering ("ADAS") equipped vehicle, generally having an instrument panel 12 and a retractable steering column assembly 14. Steering column assembly 14 generally includes a steering column shaft 16 and a steering input device, such as steering wheel 18, coupled thereto.

In the illustrated embodiment, steering column assembly 14 is movable between a retracted position 20, a deployed or driving position 22, and an accessory or utility position 24. In the retracted position 20, portions of assembly 14 such as steering wheel 18 are disposed away from the driver toward or into instrument panel 12, which provides increased space for the driver. In the illustrated embodiment, instrument panel 12 includes one or more receiving compartments or areas 26 to receive some or all of steering column assembly 14. For example, receiving area 26 may be configured to receive steering wheel 18 such that wheel 18 and thus assembly 14 may be stowed within and flush with instrument panel 12. In such an embodiment, the steering column assembly 14 is stowable, however the distance in which the assembly 14 is retracted can be varied. The displacement of the steering column shaft 16 and wheel 18 in retracted position 20 creates additional cabin space for the driver's comfort and convenience to perform non-driving activities including, but not limited to, reading, working, entertaining, eating, texting, etc.

In the driving position 22, steering wheel 18 may be used by a driver to steer the vehicle. In the accessory position 24, portions of assembly 14 such as steering wheel 18 may be used for non-driving activities such as reading, working, or other forms of entertainment. As such, at least a portion of steering wheel 18 is configured to be non-rotatable such that objects like computers or books may be rested thereupon. Further, at least a portion of the steering wheel 18 may be pivoted with respect to the steering column shaft 16 (reducing an angle between the steering column shaft 16 and the portion of the steering wheel 18) to form a work area. For example, a tray table or work surface 28 may be coupled to or integrated with steering wheel 18 to enable such activities. Alternatively, only a rim or hub of the steering wheel is non-rotatable and includes attachments such as hooks to support work surface 28. In other embodiments, an electronic device or the like is integrated into the stationary wheel 18 or work surface 28. The steering wheel 18 may also be moved to bring the work surface 28 closer to the driver as needed in the accessory position 24.

In one embodiment, steering column assembly 14 further includes a steering column adjustment assembly 30, a decoupling assembly 32, a torque interface assembly 34, and one or more sensors 36. Adjustment assembly 30 is configured to move steering column assembly 14 for driver comfort (e.g., telescope or rake adjustment) and to move assembly 14 between the retracted position 20 and the driving position 22. Adjustment assembly 30 may include one or more mechanical/electrical mechanisms such as a motor. Adjustment assembly 30 may also include a retraction mechanism that enables a driver to mechanically, electronically, or manually return steering wheel 18 from the retracted position 20 to the driving position 22.

In the driving position 22, a steering gear 44 links rotation of the steering wheel 18 to turning of the road wheels 46. The steering gear 44 may be mechanically connected to the steering column shaft 16, or alternatively may be electrically connected to the steering column shaft 16, such as in a "steer by wire" system. In one embodiment, decoupling assembly 32 is configured to selectively decouple one or more portions of assembly 14 (e.g., shaft 16) from the vehicle steering gear 44 such that steering wheel 18 is in a non-rotatable mode, removing the ability of the steering wheel 18 to control a direction of road wheels 46 through the steering gear 44. This decoupling assembly 32 may be mechanically or electrically activatable by a clutch, or by steer-by-wire, or counter-rotated by a servo-actuator, for example. Alternatively or additionally, assembly 32 may provide a counter rotation to wheel 18 to counteract any rotation of wheel 18 caused by the autonomous driver assisted steering system such that wheel 18 functions and appears as non-rotatable. The decoupling assembly 32 need not be located along the shaft 16, and may be positioned elsewhere for decoupling the shaft 16 either mechanically and/or electrically from the steering gear 44.

Further, the decoupling assembly 32 allows the steering column shaft 16 and wheel 18 to be displaced forward in the vehicle 10 to the retracted position 20 because the steering wheel 18 is no longer being used by the driver to guide the vehicle 10. The retracting action may accomplished by, for example, long stroke, electrical actuators responding to the driver's intention through a switch and motor controller, or by the driver manually releasing a clamp and pushing the steering wheel 18 and steering column shaft 16 forward to the retracted position 20. In any case, the embodiments described herein make retraction of the steering column shaft 16 and wheel 18 away from the driver possible in order to provide space for non-driving related activities such as working, reading, and game playing.

In the exemplary embodiment, torque interface assembly 34 is configured to detect and monitor driver torque input (rotational and translational) to steering wheel 18, for example, to determine if the driver is in control of the vehicle. Sensors 36 are configured to detect and monitor driver compartment conditions, the driver's condition, the vehicle environment, and/or the vehicle control systems. For example, sensors 36 may: detect objects between the retracted steering wheel and the driver that may cause an unsafe situation for the driver to safely retake control of the vehicle; detect if the driver is not in a position to safely retake control of the vehicle; and/or detect undesirable vehicle dynamics that require the driver to retake control of the vehicle. Whether in the retracted position 20, the deployed/driving position 22, or the accessory/utility position 24, the fore-aft position of the steering column shaft 16 and wheel 18 is known by the ADAS system 98 by one or both of the torque interface assembly 34 and the sensors 36, which may be positioned on the steering column shaft 16 or wheel 18. Sensors may include, but are not limited to switches and potentiometers.

The retracting or stowing process of moving the steering column shaft 16 and wheel 18 from the driving position 22 (or accessory/utility position 24) to the retracted position 20 must eventually be reversed to return steering control of the vehicle 10 to the driver. That is, the driver should be able to reach forward, grip the wheel 18, and be able to relatively quickly bring the wheel 18 to the driving position 22 to resume steering of the vehicle 10. To resume steering of the vehicle 10, the steering shaft 16 is mechanically and/or electrically reconnected to the steering gear 44. Such reconnection may be accomplished by the decoupling assembly 32, such that the decoupling assembly 32 is effectively a steering wheel coupler/de-coupler. When returned to the driving position 22, the steering column 16 and steering wheel 18 are fixed, at least temporarily, such as by the decoupling assembly 32 and/or a deactivatable, reversible lock 38, in that fore-aft position of the driving position 20. When fixed in the driving position 20, the vehicle 10 provides the ability to reduce the driver's kinetic energy, such as may result from a crash, via an energy absorbing mechanism 40 in the steering column shaft 16, the deformation of the steering wheel 18, and the deployment of the driver's air bag 42. In the deployed condition of the air bag 42, the air bag 42 is also capable of absorbing energy.

Figure 2A:
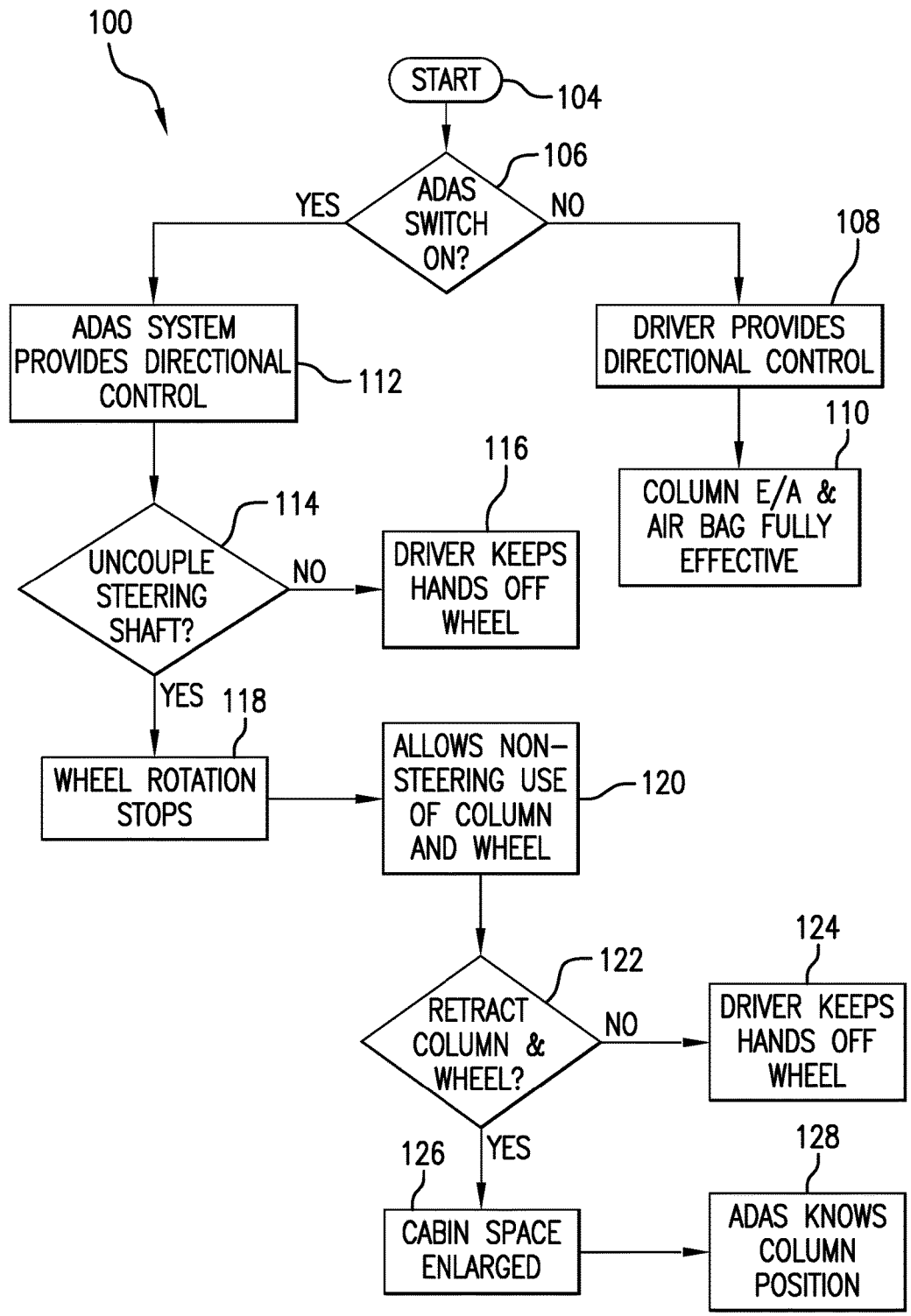
Figure 2B:
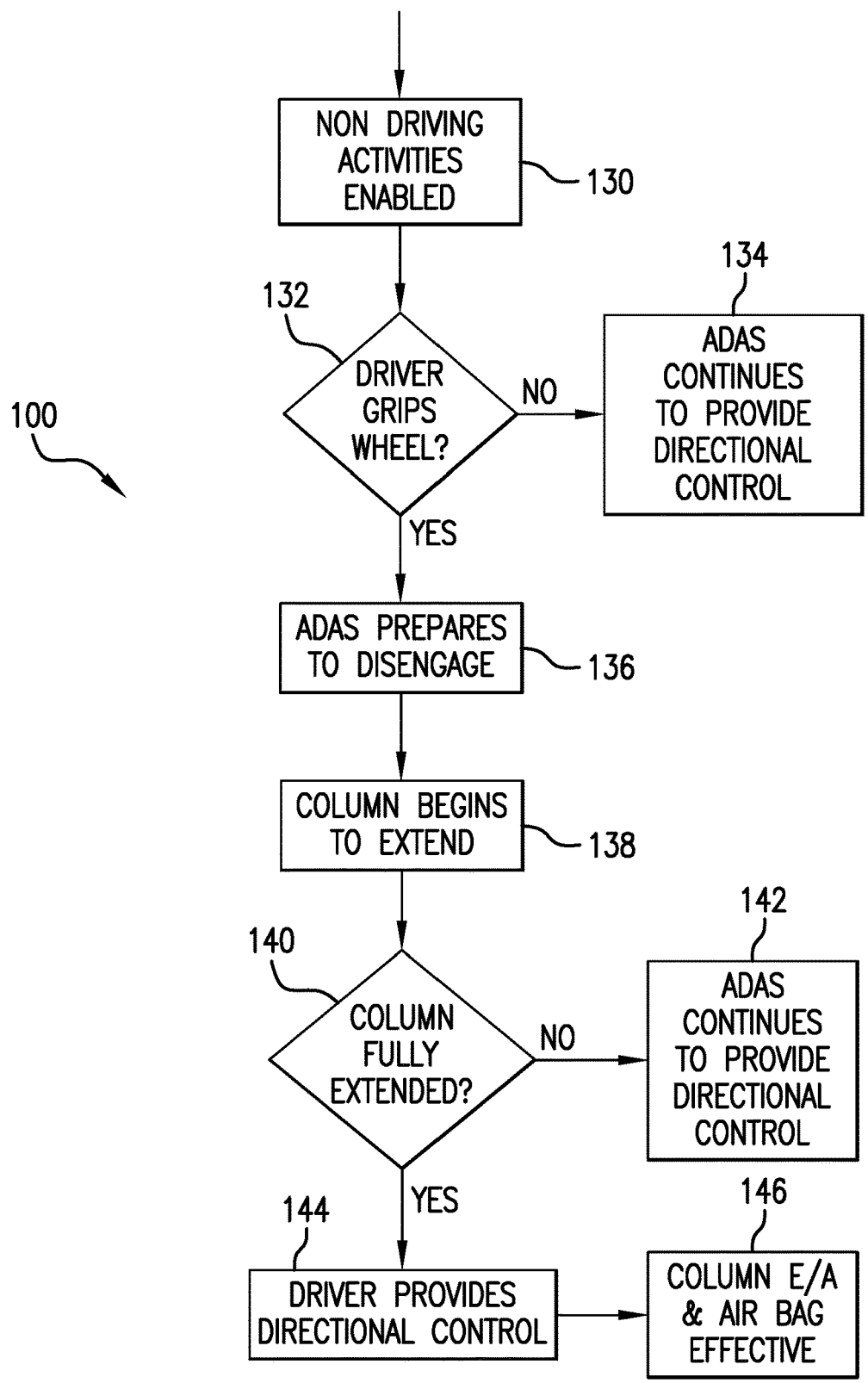

With reference now to FIGS. 2A and 2B, an embodiment of an operation 100 of the vehicle 10 is shown. Starting with FIG. 2A, a start 104 of the operation may be assessed by a controller 102 of an ADAS system, shown diagrammatically at 98 in FIG. 1. The controller 102 may receive information (signal) from, but not limited to, one or more of the steering column adjustment assembly 30, decoupling assembly 32, torque interface assembly 34, sensors 36, reversible lock 38, as well as any other feature within the vehicle 10 that is communicable with the controller 102. The operation 100 will determine, as demonstrated by block 106, whether an ADAS switch of the ADAS system 98 is on, such as by driver input to initiate the ADAS mode. When the ADAS switch is not on, then, as demonstrated by block 108, a driver provides directional control. As demonstrated by block 110, the energy absorbing mechanism 40 and air bag 42 are rendered operational (the air bag 42 is ready to deploy if required).

When the ADAS switch is on, then, as demonstrated by block 112, the ADAS system 98 provides directional control. The controller 102 further determines, as demonstrated by block 114, if the steering shaft 16 has been decoupled yet, such as by decoupling assembly 32. If not, then as demonstrated by block 116, the driver keeps hands off the steering wheel 18 in order to continue with ADAS control (otherwise, ADAS switch will be switched off due to driver input through steering wheel 18, the steering shaft 16 will remain coupled to steering gear 44, and the driver will provide control). If the steering shaft 16 is decoupled, then as demonstrated by block 118, rotation of wheel 18 is stopped.

As demonstrated by block 120, the rotationally-fixed steering wheel 18 allows non-steering use of the column shaft 16 and wheel 18.

At some point during the operation 100, a driver may wish to retract the steering wheel 18. The controller 102 will determine, such as via receipt of a signal from steering column adjustment assembly 30 or any sensors 36 relating to position, as demonstrated by block 122, if the column shaft 16 and wheel 18 are fully retracted during the retracting operation to position 20. If not, then as demonstrated by block 124, the driver will keep hands off the steering wheel 18. However, if the steering column shaft 16 and wheel 18 are retracted in the retracted position 20, then as demonstrated by block 126, cabin space within the vehicle 10 is enlarged and, as demonstrated by block 128, the ADAS system 98 is aware of the position of the column 16, such as via controller 102 and at least one sensor communicable with the controller 102.

With reference now to FIG. 2B, (a continuance of the operation 100 shown in FIG. 2A), non-driving activities are enabled, as demonstrated by block 130, due to the cabin space enlargement (block 126 of FIG. 2A). During the operation 100, the controller 102 will further determine, as demonstrated by block 132, whether or not the driver has gripped the wheel 18. If the driver does not grip the wheel 18, then as demonstrated by block 134, the ADAS system 98 will continue to provide directional control. However, if the driver has gripped the wheel 18, then as demonstrated by block 136, the ADAS system 98 prepares to disengage. As demonstrated by block 138, the column shaft 16 begins to extend. Extension of the column shaft 16 may be done via the driver and/or by automatic extension as a response to driver input. The controller 102 will determine, as demonstrated by block 140, whether or not the column shaft 16 is fully extended. If the column shaft 16 is not fully extended to the driving position 22, then the ADAS system 98 will continue to provide directional control to the vehicle 10, as demonstrated by block 142. However, if the column shaft 16 is fully extended, then, as demonstrated by block 144, the driver provides direction control via the steering wheel 18, and the column energy absorbing mechanism 40 and air bag 42 are rendered operational (with the air bag 42 ready to deploy if required), as demonstrated by block 146. Complete extension of the column shaft 16 may be determined by the controller 102, for example, by actuation of the lock 38 or information from the decoupling assembly 32 or steering column adjustment assembly 30.

Thus, operation 100 ensures that the column energy absorbing mechanism 40 and air bag 42 are operational and activatable, if needed, when the steering column shaft 16 is extended to the driving position 22 and the driver is providing directional control 108 of the vehicle 10.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column system comprising:
a steering column shaft;
a steering input device comprising a rim and a hub, the steering input device coupled to the steering column shaft;
an energy absorbing mechanism operatively engaged with at least one of the steering column shaft and the steering input device;
a column adjustment assembly configured to translate the steering column shaft and at least the hub between a retracted position and a driving position;
at least one signal indicating whether the steering column shaft is in the retracted position or the driving position, and when the steering column shaft is in the retracted position, directional control of a vehicle is automated, and when the steering column shaft is returned to the driving position as indicated by the at least one signal, the energy absorbing mechanism is operational; and
a work surface integrated with the steering input device.

2. The steering column system of claim 1, wherein the energy absorbing mechanism includes at least one of an air bag and a steering column energy absorbing mechanism.

3. The steering column system of claim 1, further comprising a decoupling assembly configured to decouple the steering input device from a steering gear, the decoupling assembly providing the at least one signal.

4. The steering column assembly of claim 1, further comprising a torque interface assembly configured to detect a torque input into the steering input device.

5. The steering column assembly of claim 1, further comprising at least one sensor configured to monitor at least one of driver compartment conditions, a driver's condition, a vehicle environment, and a vehicle control system.

6. The steering column assembly of claim 1, further comprising a decoupling assembly configured to decouple the steering input device from a steering gear, wherein at least a portion of the steering input device is non-rotatable in a decoupled condition of the steering input device.

7. The steering column assembly of claim 1, wherein the rim of the steering input device is translatable between the retracted position and the driving position.

8. A vehicle comprising:
a steering column shaft;
a steering input device comprising a rim and a hub, the steering input device coupled to the steering column shaft;
an energy absorbing mechanism operatively engaged with at least one of the steering column shaft and the steering input device;
a column adjustment assembly configured to translate the steering column shaft between a retracted position and a driving position;
at least one signal indicating whether the steering column shaft is in the retracted position or the driving position and when the steering column shaft is in the retracted position, directional control of the vehicle is automated, and when the steering column shaft is returned to the driving position as indicated by the at least one signal, the energy absorbing mechanism is operational;
a steering gear;
a decoupling assembly configured to decouple the steering input device from the steering gear, at least the rim being non-rotatable in a decoupled condition of the steering input device; and
a work surface integrated with the steering input device.

9. The vehicle of claim 8, further comprising an autonomous driving assisted steering system having a controller, the controller configured to receive the at least one signal.

10. The vehicle of claim 8, further comprising an instrument panel including at least one receiving compartment configured to receive at least a portion of the steering column assembly when the steering column assembly is in the retracted position.

11. The vehicle of claim 8, wherein the hub of the steering input device is non-rotatable in the decoupled condition of the steering input device.

12. A method of operating a steering column assembly of a vehicle, the method comprising:
translating a steering column shaft and at least a hub of a steering input device from a retracted position towards an extended, driving position;
sending at least one signal from a steering column shaft component to a controller to indicate when the steering column shaft is in the extended, driving position; and
engaging an energy absorbing mechanism to be operational when the steering column shaft is in the extended, driving position, as indicated by the at least one signal.

13. The method of claim 12, further comprising re-coupling the steering column shaft with a steering gear when the steering column shaft is in the extended, driving position.

14. The method of claim 12, further comprising translating the hub between the retracted position and the extended, driving position.

15. The method of claim 12, wherein the vehicle includes an autonomous driving assisted steering system, the method further comprising allowing the autonomous driving assisted steering system to provide directional control before the steering column shaft is in the extended, driving position.

16. The method of claim 15, wherein a driver of the vehicle provides the directional control in the extended, driving position.

17. The method of claim 12, further comprising:
translating a steering column shaft from the extended, driving position to the retracted position; and,
sending at least one signal from the steering column shaft component to the controller when the steering column shaft is in the retracted position.

18. The method of claim 17, wherein the vehicle includes an autonomous driving assisted steering system, the method further comprising activating the autonomous driving assisted steering system to provide directional control when the steering column shaft is moved from the extended, driving position.

* * * * *